United States Patent Office 3,532,971
Patented Oct. 6, 1970

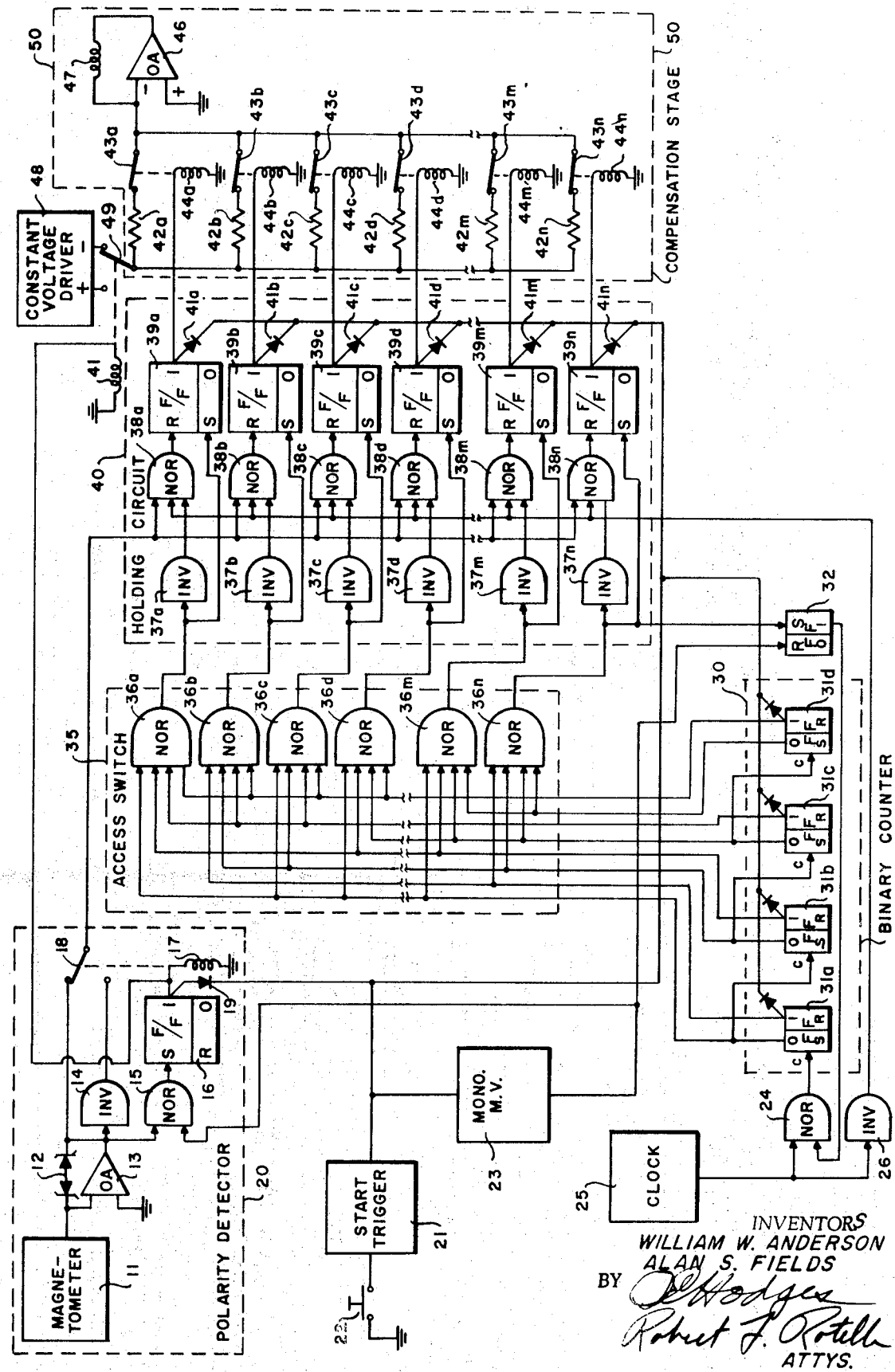

3,532,971
FEEDBACK SYSTEM FOR AUTOMATIC RANGE COMPENSATION OF A TRANSDUCER
William W. Anderson, Annapolis, and Alan S. Fields, Bowie, Md., assignors to the United States of America as represented by the Secretary of the Navy
Filed Dec. 27, 1967, Ser. No. 693,978
Int. Cl. G01r 33/02
U.S. Cl. 324—43          7 Claims

ABSTRACT OF THE DISCLOSURE

An automatic range compensator for transducers comprises a polarity detector for determining the initial polarity of the phenomenon being sensed by the transducer; a compensation circuit having stages for introducing compensating current to the transducer and discrete increments; a holding circuit for enabling each stage in the compensation circuit and testing the effect thereof, and addressing means for activating the holding circuit stages.

---

The invention described herein may be manufactured and used by or for the Government of the United States of America for governmental purposes without the payment of any royalties thereon or therefor.

BACKGROUND AND SUMMARY OF THE INVENTION

The present invention relates to measuring systems and more particularly to a system for compensating transducers in digitized steps by means of feedback.

In the field of magnetic measurement transducers or probes are widely employed to convert magnetic field intensity to a sinusoidal voltage whose amplitude is proportional to the field. This A-C voltage is converted to a corresponding D-C voltage by means of magnetometer electronics which voltage can be correlated to the actual value of the magnetic field.

Such systems are capable of great accuracy provided the field being sensed by the transducer lies within a relatively narrow range of values. When the actual field being measured exceeds this range, current is introduced through the compensating windings provided within the transducer to reduce the net field being sensed to the most accurate range of the transducer.

Heretofore such compensation has been accomplished either manually or by means of an analogue feedback network. Such techniques, however, suffer from many disadvantages. For instance, with manual compensation a compensating signal may be selected by means of calibrated potentiometers or the like and a meter employed for readout. Obviously, such a system is tedious and time-consuming to operate, requires skilled personnel and would be unsuitable for use with automatic data handling systems.

With an analogue feedback system an active feedback network is utilized to obtain a null reading. The output signal represents the full dynamic range of the transducer and can be quite sensitive. However, highly accurate readout devices are required with such a system which may not be commercially available.

Accordingly, it is an object of the present invention to provide an improved system for automatically compensating a transducer for operation in its linear range.

Another object of the invention is to provide a system for compensating a transducer in digital increments automatically.

A further object of the invention is to provide a system for automatically compensating a transducer in digital increments by means of feedback through the use of logic circuitry.

These and other objects will become apparent by reference to the following detailed description together with the accompanying drawing wherein:

BRIEF DESCRIPTION OF THE DRAWING

The sole figure is a block diagram representation of the invention.

DETAILED DESCRIPTION OF THE DRAWING

In the following description associated components are referred to by reference numerals having the same letters.

Referring to the drawing, the automatic transducer compensating system is provided with a sensor or transducer 11 of a suitable type for the particular physical measurement being carried out. For convenience, the transducer is herein represented as a magnetometer. The output of the magnetometer 11 is connected to a first input of an operational amplifier 13. The output of the operational amplifier is connected in a feedback loop to the first input through a limiter such as a pair of back-to-back Zener diodes 12 which serve to prevent the operational amplifier 13 from saturating as well as to the first terminal of a polarity selecting switch 18. The output of operational amplifier 13 is also connected to the inputs of inverter 14 and NOR gate 15. The output of inverter 14 is connected to the second terminal of switch 18. The output of NOR gate 15 is connected to the set input of flip-flop 16 in the output of which is connected through a relay coil 17 which activates switch 18 as well as through a relay coil 41 which activates the voltage driver polarity selecting switch 49 to ground. The magnetometer 11, operational amplifier 13, inverter 14, NOR gate 15 and flip-flop 16 collectively comprise the polarity detector 20, the output of which is selected through switch 18.

A binary counter 30 comprised of a series of four flip-flops 31a–d wired conventionally in cascade has its output connected to access switch 35 comprised of fourteen NOR gates 36a–n in parallel arrangement. Specifically, the "0" output of flip-flop 31a is connected to one of the inputs of NOR gates 36a, 36c . . . 36m as well as feeding the control input of succeeding flip-flop 31b of the binary counter 30. The "1" output of flip-flop 31a is connected to one of the inputs of NOR gates 36b . . . 36n. Similarly, the "0" output of flip-flop 31b is connected to NOR gates 36c . . . 36n and so on. The particular combination of the binary counter and access switch, as is well known in the art, enables one of the NOR gates 36a–n in accordance with each of the states of binary counter 30. Since the binary counter has four two-state stages it is capable of counting up to $2^4-1$ or 15. Thus each one of the 14 NOR gates may be independently enabled. The binary counter 30 is driven by the output of clock 25 fed through NOR gate 24 to the control input of flip-flop 31a.

NOR gates 38a–n are enabled by being turned off as each gate is addressed. As subsequent NOR gates are enabled the preceeding NOR gates are turned back on.

The output of access switch 35 is connected to the holding circuit 40. Holding circuit 40 is comprised of paralleled inverters 37a–n connected, respectively, to the outputs of NOR gates 36a–n. Each of the inverters has its output fed to a respective one of the NOR gates 38a–n. Each of the NOR gates 38a–n is connected at the input of the polarity detector 20 through switch 18. A further input to each of the NOR gates is connected to the output of inverter 26 which is fed by clock 25. Each of the NOR gates 38a–n is connected to a respective flip-flop 39a–n at the reset input thereof. The set inputs are connected to the outputs of NOR gates 36a–n.

The output from the holding circuit 40 is taken from the "1" side of each of flip-flops 39a–n and fed to the compensation stage 50 comprised of respective relay windings 44a–n associated with compensating switches 43a–n to ground. As each of the compensating switches is switched, connection is made between the constant voltage driver 48 through the associated set of resistors 42a–n to the input of operational amplifier 46. Resistors 42a–n are wired in a parallel configuration so that as the appropriate resistors are switched into the circuit by switches 43a–n the current flowing from the voltage driver 48 to the operational amplifier 46 will increase.

The output of operation amplifier 46 is fed back to one input thereof through the compensation coil 47 of the magnetometer 11. The polarity of the current which flows from the voltage driver 48 to compensation coil 47 is selected by means of a switch 49 associated with relay coil 41 which is actuated by the "1" output of flip-flop 16 in the polarity detector 20.

Each of the flip-flops thus described is connected at its "1" side output through diodes 19 and 41a–n to the output of the start trigger circuit 21 the operation of which is initiated by means of a push button switch 22. The output of trigger circuit 21 is also connected to a monostable multivibrator stage 23. Flip-flop 32 is connected at its reset input to the output of multivibrator 23 and at its set input to the input of inverter 37n in the holding circuit 40. The "1" output of flip-flop 32 is connected to a second input of NOR gate 24.

In operation, the initiation of start trigger circuit 21 by switch 22 will cause a pulse of approximately 10 milliseconds duration to be generated which is carried by means of diodes 19 and 41a–n to associated flip-flops 16 and 39a–n, thereby placing each of the flip-flops in the reset state by grounding their outputs. In this condition, none of the relay coils 44a–n is activated and no compensation current is supplied from the voltage driver 48 to operational amplifier 46.

The output of magnetometer 11 is fed to operational amplifier 13 having back-to-back Zener diodes 12 in its feedback path. Zener diodes 12 prevent operational amplifier 13 from saturating. The output of operational amplifier 13 will be either a positive or negative low-level voltage depending on the field polarity at the magnetometer probe thus giving a polarity indication representative of the magnetometer output. This enables determination of whether the magnetometer has made a zero crossing indicating that too much compensating current was supplied by the preceeding compensation step. The magnitude of the output voltage of operational amplifier 13 will be determined by the breakdown voltage of Zener diodes 12.

Switches 18 and 49 select the appropriate polarity of the compensation current to be supplied to bring about a magnetometer null reading. Thus, the output of operational amplifier 13 is connected directly to one pole of switch 18 and through an inverter 14 to the other pole of the switch. The polarity of the actual compensating current is selected by means of switch 49 which is connectable to the positive or negative output of the constant voltage driver 48.

The start trigger circuit 21 also activates the monostable multivibrator 23 which produces a pulse output for apporximately 10 milliseconds. At the end of the pulse its trailing edge will cause NOR gate 15 to produce an output if the polarity of the output of operational amplifier 13 is not correct. Flip-flop 16 will be set activating relay coils 17 and 41 and changing the position of associated switches 18 and 49, respectively. If the output polarity of operational amplifier 13 is correct, NOR gate 15 will not be gated on and the position of switches 18 and 49 will not be changed. This insures selection of the proper polarity of the signal fed from polarity detector 20 to holding circuit 40 and to the compensation stage. The output signal of polarity detector 20 is positive, in the preferred embodiment, to render circuit design more convenient although it is to be understood that a negative signal may be selected with appropriate circuit modifications.

The time delay afforded by multivibrator 23 is necessary to assure that all the flip-flops are restored to their reset state. Switches 18 and 49 will remain in the positions thus selected by the initial polarity of the magnetometer 11 output for the rest of the cycle of operation by NOR gate 15 being held on.

The trailing edge of the pulse output of multivibrator 23 will also set flip-flop 32 which in turn gates on NOR gate 24. With NOR gate 24 turned on, pulses from the clock 25 will be fed to the binary counter 30.

As binary counter 30 counts, each of the NOR gates 36a–n will be addressed serially and enabled. During the first clock period, NOR gate 36a will be enabled by being turned off; during the second period, none is enabled; during the third period, NOR gate 36b will be enabled and so on. As NOR gate 36a is enabled, flip-flop 39a will also be set, activating relay coil 44a. This causes associated switch 43a to switch resistor 42a into the compensation network and compensation current will flow from the voltage driver 48 to operational amplifier 46 and compensation coil 47.

Inverter 37a will be enabled as a result of NOR gate 36a being enabled during the first clock pulse. The clock output is also fed through inverter 26 to each of the NOR gates 38a–n in the holding circuit 40. In addition, NOR gates 38a–n are also fed with the output of the polarity detector 20.

During the second half of the first clock cycle, NOR gate 36a will remain enabled. In this phase of the clock cycle, a determination is made of whether the compensation step previously introduced caused the magnetometer output to undergo a zero crossing and reverse its polarity. Such an indication would signify that too much compensation current had been introduced and that the preceeding compensation step must be removed from the circuit. This is accomplished by feeding the second clock pulse, through inverter 26, to each of NOR gates 38a–n in holding circuit 40. If the preceding compensation step caused a polarity change in the output of detector 20 (which is also connected to NOR gates 38a–n), NOR gate 38a–n will permit the clock pulse to pass through resetting flip-flop 39a and causing relay coil 44a to open switch 43a thus removing the compensating resistor 42a from the compensating circuit 50. If the polarity of detector 20 had not changed, NOR gate 38a would not have been enabled and the flip-flop would have remained set, leaving the compensating step connected.

Inverters 37a–n permit those flip-flops which have turned on their respective compensation stages to remain in the set state as succeeding stages are addressed by the access switch 35 and tested for polarity reversal.

For example, consider the case where the first compensation step is to remain turned on. During the first clock pulse flip-flop 39a has been set and resistor 42a placed in circuit. During the second clock pulse (with NOR gate 36a still addressed) this condition has been tested and flip-flop 39a held in its set state. During the third clock pulse, NOR gate 36a is no longer addressed, thus will remain turned on but NOR gate 36b becomes enabled. At this point, inverter 37a yields an output signal which is fed to an input of NOR gate 38a. With the fourth clock pulse the condition of the second compensation stage is tested. Since an input is fed to NOR gate 38a from inverter 37a it cannot be enabled by the fourth clock pulse and flip-flop 39a cannot be reset. This process is continued sequentially through each of the fourteen holding circuit/compensation steps with the access switch addressing each stage for introducing compensation as well as testing for polarity reversal.

As the last stage in holding circuit 40 is addressed by NOR gate 36n of access switch 35, a pulse is sent to flip-flop 32 placing it in its set state which causes NOR gate 24 to become disabled thus deactivating the binary counter 30. To repeat the cycle of operation for a different value of field sensed by the magnetometer, the start trigger is initiated and the process repeated.

By way of example, one known type of magnetometer system is capable of measuring magnetic field intensities up to 1 oersted or $10^5$ gamma accurate to 0.1 gamma provided the probe is compensated so that the magnetometer is read on the 100 gamma scale.

Using an arrangement constructed according to the principles of the invention, a magnetometer probe was subjected to a magnetic field having an intensity of —6000 gamma. The following table shows the final compensating switch positions, the value of compensation in terms of gamma provided by each and the net field at the probe after each compensating step has been introduced.

TABLE I

| Switch No.: | Final switch position | Value in gamma | Net field after compensation |
| --- | --- | --- | --- |
| 43a | Closed | 5,000.0 | —1,000.0 |
| 43b | Open | 2,500.0 | +1,500.0 |
| 43c | do | 1,250.0 | +250.0 |
| 43d | Closed | 625.0 | —375.0 |
| 43e | do | 312.5 | —62.5 |
| 43f | Open | 156.3 | +93.8 |
| 43g | do | 78.1 | +15.6 |
| 43h | Closed | 39.1 | —23.4 |
| 43i | do | 19.5 | —3.9 |
| 43j | Open | 9.8 | +5.9 |
| 43k | do | 4.9 | +1.0 |
| 43l | Closed | 2.4 | —1.5 |
| 43m | do | 1.2 | —0.3 |
| 43n | Open | 0.6 | +0.3 |

It is to be understood that more compensation stages may be added to provide increased dynamic range and greater sensitivity. It is also to be noted that in carrying out the invention the field has advantageously been compensated to a value which is closer to a zero null than the most sensitive switch value. That is, the field has been compensated to —0.3 gamma (switch 43m) while switch 43n has a value of 0.6 gamma.

Having described the invention, it will be apparent that many modifications will be obvious to one skilled in the art and, consequently, the scope of the invention is to be measured solely by the following claims.

What is claimed is:

1. An automatic response range compensating system for transducers comprising:
   polarity detecting means responsive to the polarity of a signal sensed by a transducer;
   compensation means comprising a plurality of stages for compensating the response range of a transducer in discrete increments stage by stage;
   holding means connected to said polarity detecting means for activating each of said stages in said compensation means and for evaluating the compensating effect of each increment stage by stage;
   said holding means comprising a first series of independent switching means;
   each of said first independent switching means being coupled to a respective stage of said compensating means;
   said switching means comprising a first group of flip-flop means, each means having first and second inputs;
   said first and second inputs of said first flip-flop means comprising, respectively, set and reset inputs;
   addressing means for sequentially enabling each of said first independent switching means;
   said addressing means being connected to each of the first inputs;
   a plurality of disabling means connected to each of the second inputs for disabling particular flip-flops whenever the transducer is compensated beyond a predetermined limit;
   said disabling means comprises a plurality of first NOR gate means;
   each of said first NOR gate means being coupled at an input thereof to said polarity detecting means;
   clock pulse generating means connected to another input of each of said first NOR gate means; and
   a plurality of first inverter means connected between said addressing means and said first NOR gate to provide still another input to each of said first NOR gate means.

2. An automatic response range compensating system for transducers as set forth in claim 1 wherein:
   said clock pulse generating means is connected thru a second inverter means to said another input of each of said first NOR gate means.

3. An automatic response range compensating system for transducers as set forth in claim 2 wherein:
   said polarity detecting means includes:
      first operational amplifier means for connection with a transducer;
      the output of said first operational amplifier constituting a first output of said polarity detecting means;
      said first operational amplifier means output being additionally connected through third inverter means to constitute a second output of said polarity detecting means ;
      said first and second outputs being selectively connected to said first NOR gate means.

4. An automatic response range compensating system for transducers as set forth in claim 3 wherein:
   the output of said first operational amplifier means is connected to second flip-flop means through second NOR gate means;
   voltage source means;
   said voltage source means having positive and negative polarity outputs;
   said outputs being selectively connected to said compensation means;
   said second flip-flop means selecting the output of said polarity detecting means and the output of said voltage source means.

5. An automatic response range compensating system for transducers as set forth in claim 4 wherein:
   said compensation means includes a plurality of resistance means each being connected at one end thereof to said voltage source means;
   the other ends of said resistance means being connected by second switching means to the compensating circuit of the transducer;
   said second switching means being controlled by said first flip-flop means.

6. An automatic response range compensating system for transducers as set forth in claim 5 further comprising:
   pulse trigger means connected to said first and second flip-flop means;
   pulse delay means;
   said pulse delay means being connected to said second NOR gate means;
   third flip-flop means;
   said third flip-flop means being connected to the finally sequenced element of said first independent switching means to be enabled by said addressing means;
   said pulse delay means being connected to said third flip-flop means.

7. An automatic response range compensating system for transducers as set forth in claim 6 wherein:
   said addressing means comprises binary counter means;
   access switch means;
   said binary counter means being coupled to said access switch means;
   third NOR gate means;
   said clock pulse generating means being connected through said third NOR gate means to said binary counter means; and
   said third flip-flop means being connected to said third NOR gate means.

(References on following page)

References Cited

UNITED STATES PATENTS

| | | | |
|---|---|---|---|
| 2,839,740 | 6/1958 | Haanstra | 324—990 |
| 2,896,198 | 7/1959 | Bennett | 324—990 |
| 2,901,685 | 8/1959 | Alder | 324—990 |
| 2,996,669 | 8/1961 | Morgan et al. | 324—990 |
| 3,052,845 | 9/1962 | Bowes et al. | 324—990 |

RUDOLPH V. ROLINEC, Primary Examiner

R. J. CORCORAN, Assistant Examiner

U.S. Cl. X.R.

324—99